United States Patent [19]
Reed

[11] 3,774,215
[45] Nov. 20, 1973

[54] POSITION LOCATING SYSTEM
[75] Inventor: Roger R. Reed, Arlington, Mass.
[73] Assignee: General Systems Development Corporation, Waltham, Mass.
[22] Filed: Nov. 23, 1970
[21] Appl. No.: 92,017

[52] U.S. Cl. ...... 343/112 D, 343/105 R, 343/112 R, 343/100 ST, 235/150.27
[51] Int. Cl. ............................................. G01s 5/12
[58] Field of Search ................. 343/105 R, 100 ST, 343/112 D, 112 R; 235/150.27

[56] References Cited
UNITED STATES PATENTS

| | | | |
|---|---|---|---|
| 3,715,758 | 2/1973 | Sender | 343/112 D |
| 3,534,367 | 10/1970 | Laughlin et al. | 343/105 R |
| 3,150,372 | 9/1964 | Groth | 343/112 D |
| 3,495,260 | 2/1970 | Laughlin et al. | 343/105 R |
| 3,471,856 | 10/1969 | Laughlin et al. | 343/100 ST |

Primary Examiner—Benjamin A. Borchelt
Assistant Examiner—Denis H. McCabe
Attorney—Weingarten, Maxham & Schurgin

[57] ABSTRACT

A position locating system for a vehicle with an on-board means for detecting differences in phase between a reference frequency and received radio-beacon navigation signals. Phase data representative of the detected phase differences is transmitted from the vehicle to a communication station which has associated therewith a central processing unit time shared with other communication stations for calculation of vehicle position from required phase data. The calculated position locates the vehicle in any of selectable reference frames requested by the vehicle and is compensated for local beacon signal propagation variations. Position data is transmitted back to the vehicle for indicating vehicle position. To accommodate a plurality of vehicles, transmission time at each communication station is time shared. To communicate with a station, a vehicle selects from a series of time blocks the strongest signal and consequently nearest station and seizes an idle time slot within that time block. Acknowledgement and synchronizing procedures insure accurate synchronization between station and vehicle and prevent vehicles from receiving each other's data.

35 Claims, 8 Drawing Figures

INVENTOR
ROGER R. REED

POSITION LOCATING SYSTEM

FIELD OF THE INVENTION

The present invention relates generally to position locating systems and in particular to automated, radio beacon phase differencing, multiple vehicle position locating systems using wireless, time-shared computation facilities.

BACKGROUND OF THE INVENTION

Recreational small-craft owners and land-based vehicle fleet operators are in a position to profit from an automated position locating system.

The increasing popularity of small boat recreation has resulted in an expanding need and market for an automated and yet inexpensive small-craft navigation system. The more frequent use of the coastal waterways of the United States and other areas of the world has greatly increased the collision hazard between boats requiring preventive controls. Also, the limited navigation skills of many operators, particularly when in unfamiliar areas, presents a clear hazard to themselves and their passengers under conditions of poor visibility. This increased number of small boat opertors, furthermore, has neither the money to purchase the traditional sophisticated navigational aids such as radar and loran nor the time to devote to acquiring the skills of a professional navigator.

The present invention is especially suited for fulfilling the needs of small-craft users, providing for them an inexpensive, automated, and accurate position locating capability.

An extension of the same concept allows the operators of land vehicle fleets to locate the position of any of their vehicles and to exchange any of several predetermined control and status messages with them.

There presently exists an expanding system of VLF Omega stations providing global reception of broadcasts from a projected eight radio beacons of which an operable number now exist. These Omega beacons, each transmitting on three VLF frequencies, can be used for position locating by detecting the phase differences of signals received from at least three Omega beacons. Equipment for determining position from such a series of phase differences, to be useful and safe for the recreational boater, would have to include a sophisticated computer well beyond the cost practicality for such a person. It is thus necessary to have a central time-shared computation facility with at least one large central processing unit performing the complex position calculations for a plurality of small-craft which are in wireless communication with the computation facility.

Similar approaches have been suggested in U.S. Pats. to Laughlin, No. 3,471,856 and Knauth, No. 3,493,970. These systems, however, representative of prior-art position locating systems dealing with a limited number of movable vehicles, are inherently incapable of servicing the great numbers of pleasure craft which are presently found in many areas of this country. These prior-art designs operate by having each vehicle retransmit on a different frequency the received radio beacon signals. A remote station which detects these retransmitted beacon signals performs the phase measurements and position calculations. Relatively long transmission times are required for each vehicle in order to allow a remote station to make accurate phase measurements, thereby limiting the number of possible users for such a navigation system if each user is to receive a position calculation within a practically short time period, such as a minute or two.

The present invention has overcome this problem of prior art systems by providing each vehicle with electronic equipment to make phase measurements directly on board and convert them to a digital message for transmission to the computation facility in time-shared fashion over a VHF, FM channel. This division of functions between the vehicle and computer facility allows a given phase measurement to be performed over as much of the Omega station transmission time as is desired without conflict with other users.

Normally, accurate phase-difference measurements of the type required for Omega based position locating would require a very accurate on-board reference frequency tuned to precisely the same frequency as the Omega frequency being used so that the phases of each Omega station at the point of reception can be compared by first comparing each sequential Omega signal to the reference. The expense of such an oscillator would be great and place it beyond the reach of most persons in the small-craft market that such a system is to serve.

Because many phase measurements are needed to obtain an unambiguous fix, the present Omega system provides for broadcasting on three frequencies by each beacon. To receive three frequencies and to make phase measurements from each frequency would further increase the cost of the onboard equipment to the exclusion of all but the affluent operators and thus defeat its purpose.

In addition to exchanging phase and position data between a computation center and vehicle located equipment it is necessary to provide time to exchange data which insures safe and reliable operation of any position locating system, prevents false information from being transmitted between vehicle and computation center, and prevents error in vehicle identification. It is also desirable to provide for the transmission of warning or alert messages from the computation center to selected vehicles, and the transmission of distress messages by the vehicle to the central processor.

To provide this additional information capability in prior-art designs of the type indicated above would require additional communication frequency assignments or complicated transmission sequence plans if further phase measurement accuracy loss is to be prevented.

BRIEF SUMMARY OF THE INVENTION

An exemplary preferred embodiment of the invention comprises a time sharing navigation system for allowing a plurality of movable vehicles to determine their position quickly and accurately.

The position locating function is shared between vehicle-based equipment and equipment available to fixed communication stations such that the total cost to the user for his own equipment and using the fixed stations' services is kept within the reach of the vast number of pleasure-boat operators and can economically increase land vehicle fleet capacity. The vehicle-based equipment contains only enough functions to allow for an efficient and accurate wireless exchange of information between the fixed communication stations and a plurality of movable vehicles on a time shared basis.

The fixed communication stations, of which many are provided to cover an extensive area or coastline, communicate with at least one central processing unit over a time shared data link thereby making available to each movable vehicle a powerful calculating tool which not only calculates the vehicle's position, but expresses it in one of several selectable reference frames including latitude and longitude; and range and relative bearing.

The radio beacon grid which each vehicle measures for ultimate position determination is the system of constant-phase hyperbolas established by phase locked broadcasts from at least three of the global network of an eventual eight VLF Omega radio beacons. From the reception of these Omega broadcasts, each vehicle generates phase data representing the phase difference between the received beacon signal and a local reference frequency. Short-term linear phase drift in the vehicle's reference oscillator is calculated at the central processing unit by computing the difference in phase measurements reported by the vehicle for two time-spaced phase measurements on the same beacon after gross frequency errors are resolved by transmission of an oscillator calibration message in response to an interrogation by the computer.

Each fixed communication station communicates over a line-of-sight VHF FM channel with a plurality of vessels closest to it on a time-shared random-access basis by assigning to each requesting vessel a specific time slot in a time block assigned to that fixed station. A series of time blocks are assigned to a corresponding string of communication stations stretching along the coast or covering an area in an assignment pattern which separates communication stations using the same time block by a distance which insures that no vehicle will receive data from a communication station other than the one it is communicating with, and that no vehicle will interfere at other communication stations.

The message format of each time slot provides not only for transfer of phase data to the communication station and position data to the movable vehicle, but provides for a number of channel control messages within the time slot which, collectively, indicate unused slots and provide for vehicle identification signalling and acknowledgement to insure one and only one vehicle is assigned to each time slot. The message format also provides means for the operator of a vehicle to identify a specific coordinate system for display of position information and for the operator of the vehicle to convey distress messages or other service requests to the central processor.

For economy, phase differences are derived from the reception of a single frequency from at least three Omega radio broadcasts. These phase measurements will normally produce an ambiguity in position which is resolved by the central processing unit on the basis of a measurement of range between each vehicle and its communicating fixed station. When necessary, a phase comparison with a fourth and fifth Omega beacon broadcast can be used to resolve residual ambiguities. The range measurement is established by the propagation delay between the fixed station and each vehicle, providing a simple means for establishing a circular position locus for each vehicle which need only be accurate enough to eliminate the widely scattered ambiguous positions associated with the single frequency Omega phase measurements. By using only one Omega frequency and by using an approximate range measurement for ambiguity resolution a less expensive system for the user results and provides increased vehicle capacity by reducing the number of message transactions required for a position fix.

While this position locating system finds important application in the small-craft market, it may also be used as a land-based vehicle locator by having each land vehicle, e.g., truck, periodically capture a time slot and transmit phase measurements.

DESCRIPTION OF THE DRAWINGS

The invention will be more fully understood from the following detailed description, taken in conjunction with the accompanying drawings, in which.

DETAILED DESCRIPTION OF THE PREFERRED EMBODIMENT

Figure 1:
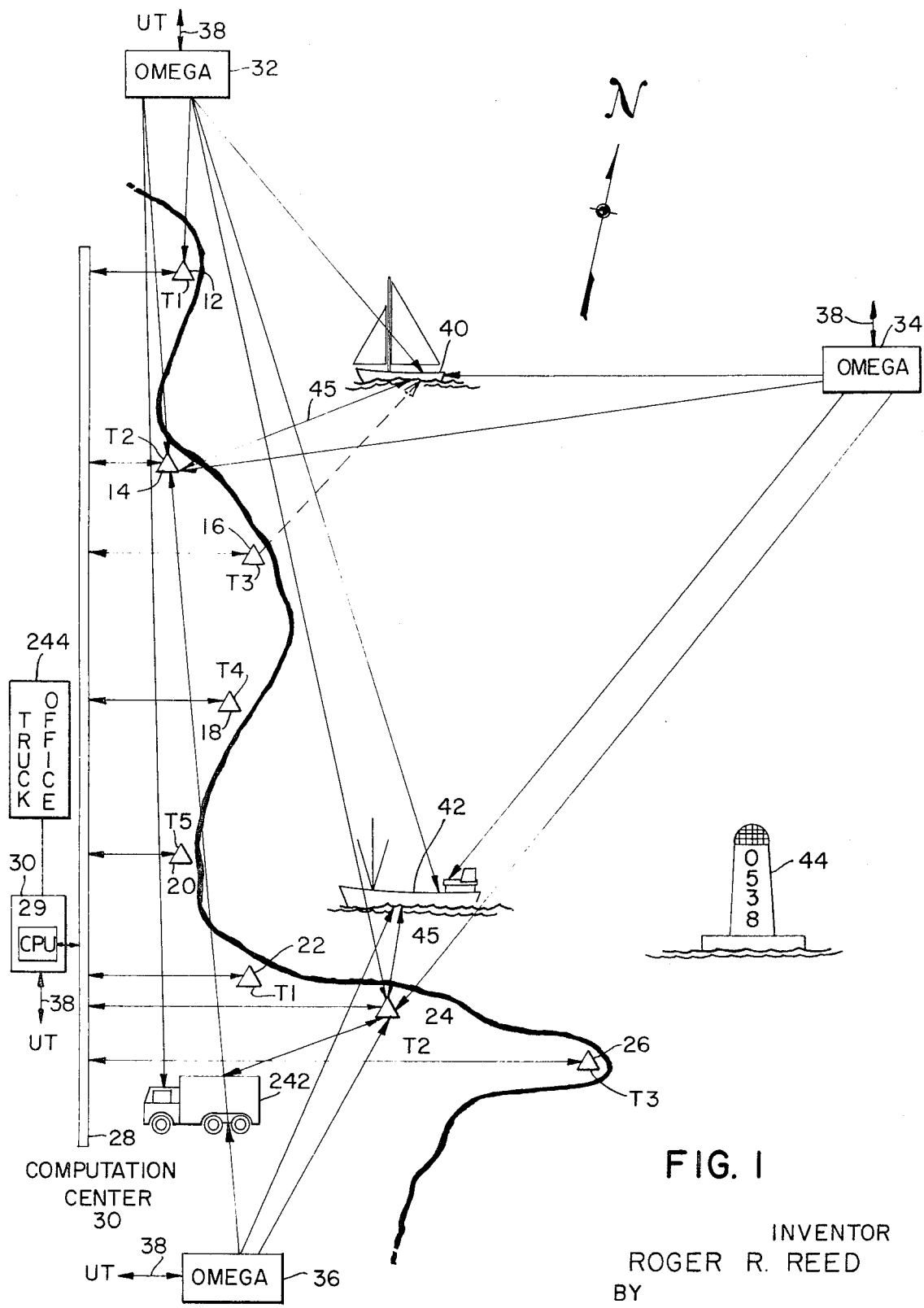
FIG. 1 shows diagrammatically and pictorially a section of coastline having fixed communication stations, a time shared computation center, a listed landmark, Omega stations, and a plurality of vehicles.

Referring to FIG. 1 there is shown diagrammatically and pictorially a section of coast line having placed there-along at approximately 50 mile intervals a series of fixed communication stations 12, 14, 16, 18, 20, 22, 24 and 26. The stations 12 and 22 are members of a group designated T1, stations 14 and 24 members of group T2, stations 16 and 26 members of group T3, station 18 is a member of group T4 and station 20 a member of group T5. Each station in the groups T1 through T5 is in data communication over a land-line data link 28 with a central processing unit 29 at a computation center 30. Scattered throughout the world will ultimately be eight very-low-frequency (VLF) radio beacons designated Omega stations and indicated in FIG. 1 as 32, 34, and 36. It must be understood that the Omega stations 32, 34, and 36 are scattered with far more distance between them than is indicated in FIG. 1. All Omega stations are kept in exact phase lock on a precise universal time frequency by an interconnection 38 which is an integral part of the Omega system. While each Omega station sequentially broadcasts in phase lock on three frequencies, only the most accurate of these, 10.2 kHz, is used in the preferred embodiment of this invention to save cost in the consumer purchased portion of the system. Each of eight Omega stations is assigned a 1 ¼ second time block out of a 10 second cyclic period and transmits for about four fifths of a second within the block.

A navigation terminal for this system is located in pleasure craft shown as vessels 40 and 42. The terminal contains a 10.2 kHz Omega receiver and a local reference oscillator with an output at substantially the same frequency as the 10.2 kHz omega frequency. The terminal performs a phase measurement of the phase difference between the local reference oscillator and the received Omega broadcast from each of several Omega radio stations in sequence.

Also, as part of the navigation terminal on each vessel 40 and 42 is a transceiver for exchanging data with a nearby fixed communication station within one of the groups T1-T5. Phase data information obtained from each received Omega broadcast at each vessel is digitally expressed in a data word which is transmitted to a nearby fixed communication station. A sequence of several phase measurements corresponding respectively to several Omega stations provides sufficient data for determining a fixed position as one of several possible positions. Ambiguity is resolved by a range measurement made by detecting the round-trip propagation delay for a message from the communication station to a vessel and back to the communication station.

Each fixed communication station forwards raw phase data and range data through data link 28 to the computation center 30 where the ship's exact position is computed. Normally phase differences from three Omega stations plus one set of range data will be enough to uniquely specify the vessel's position or specify it sufficiently so that a fourth Omega station phase measurement will resolve the final ambiguity. Occasionally, a fifth Omega station is necessary, but since eight stations are planned for the global network, there will be ample Omega stations available for unique position locating using this system anywhere in the world.

The vessel's unique position as computed by the computation center 30 can be in any of several selectables coordinate systems. One coordinate system is, of course, latitude and longitude. A series of landmarks such as lighthouse 44 along a coast line can be identified by a unique number, in this case 0538, and each vessel can, by transmitting to a fixed communication station the number of a selected landmark, obtain its position information in terms of range and bearing relative to that landmark. Other special reference frames where desired may be numerically specified. The position data, in whatever frame of reference requested, is communicated to each vessel from the computer via the land-line data link 28 and communication station and from there to each vessel by wireless paths 45.

Figure 2:
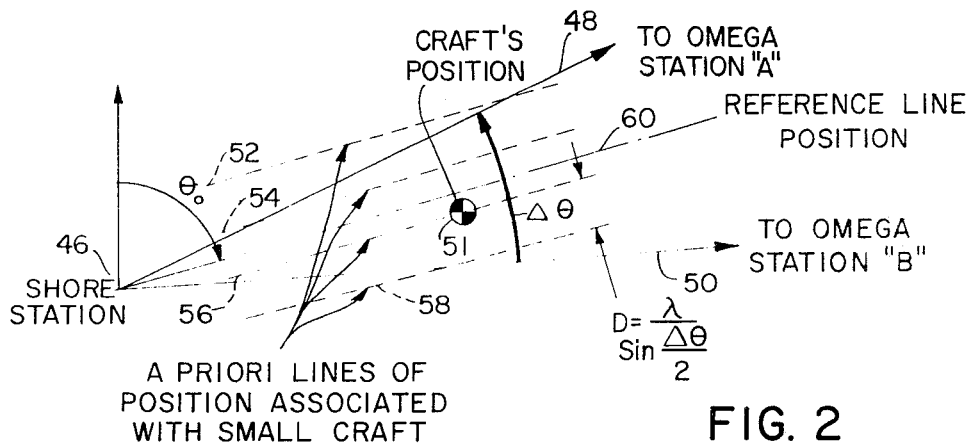
FIG. 2 shows a small area representation of specific phase difference a priori lines of position established from Omega station phase differences at a specific small-craft as practiced by the invention.
Figure 3:
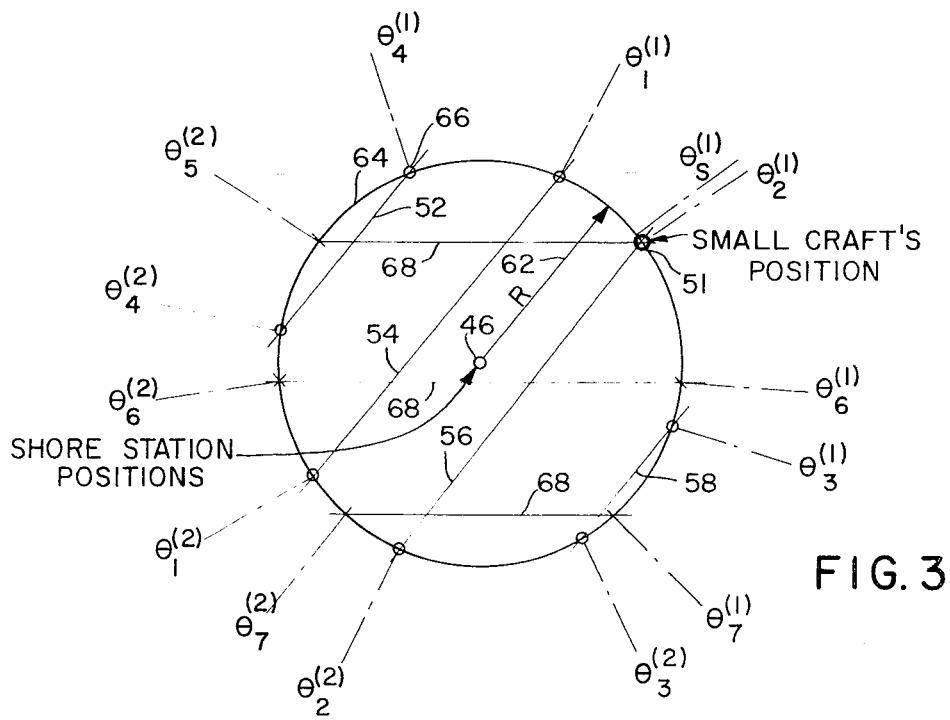
FIG. 3 shows an estimated range locus applied to FIG. 2 for resolving positional ambiguities.

The method of which ambiguities are resolved can be best understood by reference to FIGS. 2 and 3 showing vessel position lines and the steps used in obtaining a fix therefrom. Shown in FIG. 2 is a shore station 46 and two vectors 48 and 50 pointing from the shore station 46 in the direction of Omega stations A and B. From phase data representing the phase difference between the local oscillator on a vessel 51 and each Omega station A and B the difference in phase between the received broadcasts can be determined. This phase difference defines a set of hyperbolic lines across the surface of the earth appearing as a priori lines of position 52, 54, 56 and 58 in FIG. 2, which are straight because of the small scale. In general, these a priori lines of position 52, 54, 56 and 58 will be parallel to and displaced from a line 60 from the fixed communication station 46 bisecting the vectors 48 and 50. The line 60 represents the locus of points at which the Omega stations A and B are received with the same phase relationship as at the communication station 46. The a priori lines of position 52, 54, 56 and 58 are essentially parallel to line 60 and displaced therefrom by an amount representative of the change in phase difference between the A and B Omega station broadcasts as received at the communication station 46 and the phase difference between the A and B Omega broadcasts as received at the vessel 51.

If now a range 62 from vessel 51 to station 46 in FIG. 3 is established from round trip propagation delay, a circular line of position 64 can be drawn limiting the vessel's possible position to the intersection of the circle 64 and the a priori lines of position 52, 54, 56 and 58, etc. indicated by small circles 66 in FIG. 3. A second set of parallel lines of position 68 can be determined by a phase measurement between one of the Omega stations A and B and a third station C. Normally, the points of intersection of the circle 64 with these two sets of parallel a priori lines of position will produce a coincident intersection at only one point on the circle 64 as at 51, the vessel's exact position. If ambiguity still exists, however, a fourth or even, at the most, a fifth phase measurement can be taken from a fourth and fifth Omega station broadcast.

Preferably, but not necessarily, the communication range of each transceiver aboard vessels and fixed communication stations is limited to line of sight distances by the use of a VHF channel for the communication frequency. This means that each vessel will be normally much closer than 50 miles to a fixed communication station taking antenna height into account. Since the wave length of the Omega frequency used is approximately 18 miles, the number of possible positions for each set of parallel a priori lines and a circular range locus cannot normally be excessive and will allow for a single exact positional fix by the addition of a second set of parallel a priori lines in the usual case. The amount of computer calculation required for exact position under the circumstances is not so great as to be prohibitively expensive for the private user. Once an initial resolution of ambiguity is achieved, vehicle position ambiguity may be resolved by selecting as each vehicle's exact known position the calculated position geographically closest to that vehicle's last known position.

Figure 4:
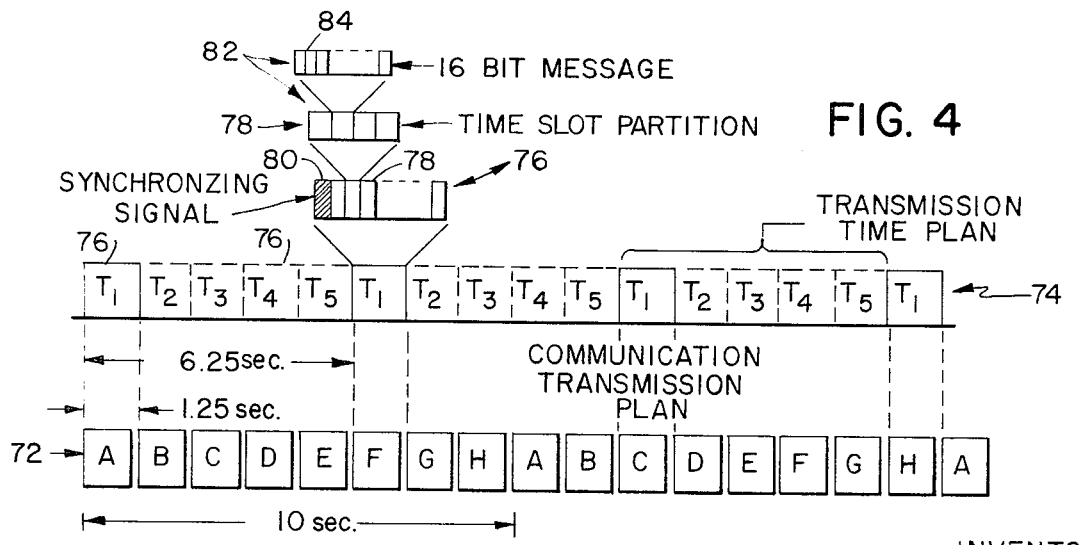
FIG. 4 shows transmission plans for both Omega and communication channels used in the invention.

In order to accommodate a plurality of coastal vessels under this position locating system and in particular in order to provide a position locating service for a plurality of vessels from each fixed communication station, it is necessary to adopt a time sharing communication system whereby each vessel is assigned a specific periodic time interval for data transfer with the nearest fixed communication station. Referring to FIG. 4, theree is shown diagrammatically a transmission plan for both the Omega stations and the VHF data channels between vessels and fixed stations.

The Omega station transmission plan 72 comprises a 10 second repetitive sequence during which each of eight Omega stations labeled A, B, C, D, E, F, G, and H are assigned a 1 ¼ second time block within which their 10.2 kHz navigation tone is transmitted. The VHF communication transmission plan 74 is composed of a series of time blocks 76 designated T1, T2, T3, T4 and T5 to correspond to the groups of fixed communication stations indicated in FIG. 1. Each time block, for intance, block T2, is assigned as the communication time for the stations in corresponding group T2.

Spacing of all fixed communication stations within the same group is preferable such that no vessel in communication with one station in that group can receive an interfering signal from another station in that group. To accommodate more vessels spacing can be reduced, and satisfactory operation preserved, by having the computation center assign time slots on the basis of the closest communication station to a vessel in the case where a vessel's transmission is received by two communicaton stations in the same time slot of the same time block. Range determination allows the choice of the closest communication station, and the hard-limiting FM characteristic of the VHF channel prevents interference from other communication stations in the same time block thereafter. A further increase in vessel handling capacity can be obtained by subdividing the stations of a group into classes each class uniquely assigned every Nth block.

Each time block 76 has 192 equal time slots 78 preceded by a synchronizing time segment 80. Each time slot is assigned to a requesting individual vessel for periodic communication with that vessel. The time slots 78 are further subdivided into four message segments 82 containing 16 bits of information each. The synchronizing segment 80 is identified by a unique code and allows synchronization between vessel and communication station. Synchronization of all transmissions from a fixed communication station is maintained at the computation center 30.

Figure 5:
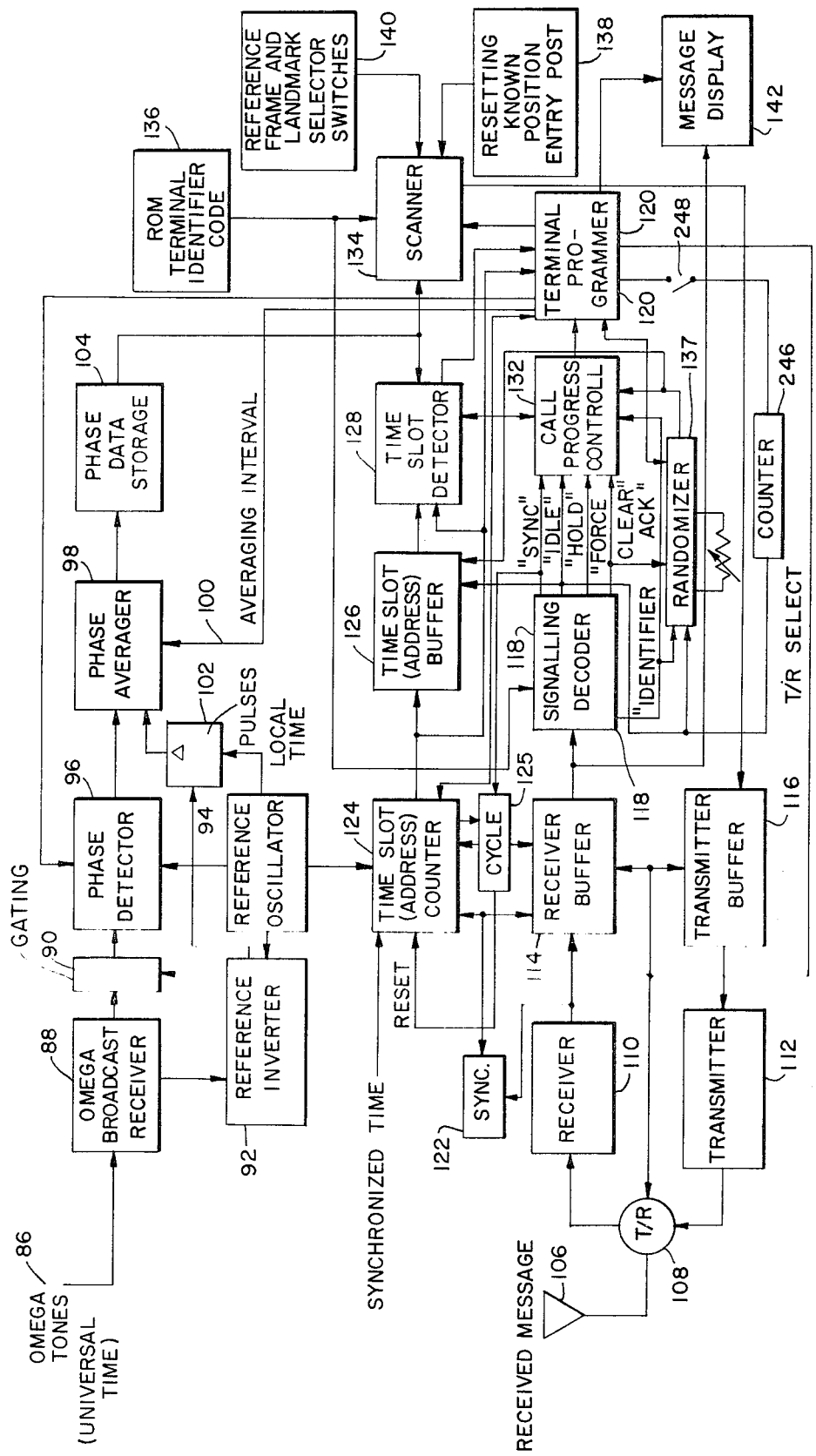
FIG. 5 shows a block diagram of the electrical equipment used according to the invention at each vessel for data communication and phase measurements.

Better understanding of the operation and construction of the present invention may be had by referring to FIG. 5 showing in block diagram an exemplary vessel-located terminal according to the invention.

Omega signals are received by the VLF antenna 86 and an Omega receiver 88 amplifies the 10.2 kHz received Omega signals and applies them to the input of a phase gating circuit 90. Also input to the gating circuit 90 is the output of a reference inverter 92 which is in turn fed 10.2 kHz oscillations from a reference oscillator 94. The reference oscillator contains a base frequency oscillator at, for example, 652.8 kHz with a count-down to provide a 10.2 kHz signal (÷64). The reference inverter 92 also receives the Omega signals from the receiver 88. It functions to invert the phase of the 10.2 kHz reference oscillator 94 if the phase of the received signal is within 90° of the phase of the reference oscillator 94. The gating circuit 90 has an output which is a "one" binary state only when both its inputs are of the same given polarity, for instance positive.

The presence of the reference inverter 92 insures that the output of the gating circuit 90 will be in the one binary state between 25 percent and 75 percent of the time. Without this reference inverter, the output of the gating circuit 90 could vary between "zero" and one, an indicated 0° and an indicated 360° phase difference, for the condition of a zero phase difference between reference and Omega signals. Due to averaging methods used later in the circuit this jitter between zero and 360° outputs would destroy the accuracy of the phase measurement.

The output of the gating circuit 90 is fed to a phase detector 96 along with the base frequency oscillations from the reference oscillator 94. The phase detector 96 passes pulses at the base frequency of oscillator 94 to a phase averager 98 during the time that the output of the gating circuit 90 is in one binary state. These pulses are counted in phase averager 98 for an averaging interval determined by a signal on line 100. The averaging interval is substantially equal and coincident to the time of transmission of the corresponding Omega station in the 10 second periodic transmission plan.

In the event that the reference inverter 92 has inverted the phase of the output oscillator 94 fed to the gating circuit 90, an inversion-compensator circuit 102 connected to the reference inverter 92 and oscillator 94 adds to the phase averager 98 and indication of the number of pulses corresponding to a 180° phase shift in the received Omega signal.

Phase data storage register 104 receives as binary data the accumulated count in phase averager 98. This binary data, representative of the phase difference from each phase measurement, is held for later transmission in the terminal's time slot, to a fixed communication station on shore.

Communication with the fixed communication station on shore is conducted at line-of-sight VHF frequencies through a VHF antenna 106. A duplexer 108 switches the antenna 106 between a hard-limiting F.M. receiver 110 and an FM transmitter 112 preferably on the same frequency. Respective receiver buffer 114 and transmitter buffer 116 process and store, data accumulated during reception or prior to transmission.

A signalling decoder 118 is fed data from the receiver buffer 114 to interpret the received data.

It is more logical here to explain the further operation of the vessel-located terminal circuitry of FIG. 5 by tracing the operations whereby a vessel is assigned a specific time slot with a specific fixed communication station for data exchange therebetween. When the vessel operator desires a position determination, the FIG. 5 circuitry is activated and a terminal programmer 120 goes into a search mode enabling the receiver 110 and receiver buffer 114 to listen continuously for transmissions from all neighboring fixed commuuniction stations in their respective time blocks.

The output of the receiver 110 is fed to a synchronizing circuit 122 which adjusts the phase of a time slot counter 124 to coincide in phase with the 10.2 kHz bit rate of the VHF communication channel. The time slot counter 124 comprises a countdown chain (divide by 64) for the basic frequency from oscillator 94 as inputted to counter 124. The phase synchronizing function is accomplished by adding or deleting pulses from oscillator 94 to the countdown chain of the counter 124. The synchronizing circuit, for example, may contain a gating circuit which detects lag or lead between the 10.2 kHz bit rate and counter 124 and accordingly adds or deletes a pulse into the countdown chain.

Synchronizing to the strongest time block is achieved by permitting the time slot counter 124 to reset only at the beginning of the time block for the most strongly received communication station. To achieve this, the receiver buffer 114 derives a threshold signal based on the signal level of the strongest received time block so that only signals approximately equal to the strongest are passed to the decoder 118.

Thereafter synchronizing to the same time block is achieved by timing means. Recognition logic within the signalling decoder 118 signals a cycle detector circuit 125 to inhibit the receiver buffer 114 from passing signals to the decoder 118 until a selected count in the counter 124. The selected count is chosen to be just under the count for a complete cycle of the time block transmission plan 74. After this count, the synchronizing segment 80 for the most strongly received signal will be about to occur. With the cycle detector circuit 125 thus set, the buffer 114 is enabled to pass to the decoder 118 where it resets the counter 124 at the start of the time block corresponding to the strongest and, correspondingly, the nearest station.

In addition to transmitting a "sync" signal prior to the first time slot of its own time block each communication station transmits data or control messages in occupied time slots and an "idle" signal in each time slot which is not in use. Recognition logic within the signalling decoder 118 also signals a time slot buffer 126 on the occurrence of the first idle signal in the strongest time block as received from the buffer 114 at which time the contents of the time slot counter 124 are shifted into and recorded in the time slot buffer 126. A time slot detector 128 will thereafter recognize the presence of that time slot by coincidence of the contents of the counter 124 and the contents of buffer 126.

The detection of the occurrence of this first idle slot by the time slot detector 128 causes an enabling pulse to be applied to a call-progress control circuit 132 permitting the call progress control circuit 132 to respond to messages from the decoder 118. The initial recognition of an idle code by decoder 118 sets the call progress control circuit 132 into a logical state which results in a signal to the terminal programmer 120 which in turn activates a scanner circuit 134 by means of which a "terminal identifier" code permanently, digitally recorded in an ROM 136, is conveyed to the transmitter buffer 116 and therafter is transmitted via the transmitter 112, duplexer 108 and antenna 106 as activated by the terminal programmer 120 during the next time slot recognized by time slot detector 128.

Unless another vessel closer to the fixed communication station for this time block is trying to capture this same time slot, this vessel terminal identifier code will immediately be received by the fixed communication station and the computation center 30 will cause a "hold" code signal to be returned by the communication station in that same time slot and in each succeeding time block until the computation center 30 via the fixed communication station acknowledges the new subscribed by transmission of a terminal identifier acknowledgement code signal consisting of the vessel's terminal identifier code. If a hold signal is detected, the terminal programmer 120 maintains its state; if not, time slot detector 128 is cleared and programmer 120 begins the search for another idle time slot. Transmission of and recognition of an "identifier acknowledgement" code signifies the assignment of that time slot to the vessel so identified. The call progress control circuit 132 interprets this identifier acknowledgement code as such and signals the terminal programmer 120 to proceed with further data exchange.

In the event that more than one terminal attempts to seize the time slot the terminal identifier acknowledgement system in conjunction with the hard-limiting FM communication system permits the nearest identified terminal to proceed with data exchange, and causes the other terminals to clear from the time slot by virtue of failure to receive either a hold or their own identifier acknowledgement code.

In this way both a hold and the correct terminal identifier acknowledgement must be received for the vessel-located terminal to consider itself assigned to a requested time slot. This provides a double safety system which avoids the possibility of reception of faulty navigational data.

In the event that two or more vessels interfere in their transmissions seeking assignment of the same time slot, the composite signal received by the fixed communication station is normally interpreted by the computation center 30 as a noise condition whereupon the computer transmits a "force-clear" code which is interpreted by the call progress control circuit 132 in each vessel as a signal to recommence the search for an idle time slot. If the composite signal looks like a valid but incorrect identifier the subsequent failure by each vehicle to detect its own identifier acknowledgement causes each vehicle to recommence an idle slot search. When the two or more vessels attempt again to seize the same time slot it is not unlikely that a shift in vessel position will have occurred resulting in a change in relative received signal levels at the communication station and assignment to the most strongly received request first. In the case where this shift in signal levels does not occur a randomizer circuit 137 is provided in the vessel-located terminal of FIG. 5 to receive the idle, identifier acknowledgement and force-clear signals from the decoder 118 and a search mode indication from the terminal programmer 120. The randomizer 137 functions to randomize the next idle signal in the specific time block of the strongest communication station signal which the vessel-located terminal attempts to capture.

This is accomplished when the randomizer 137 senses an incorrect identifier acknowledgement or a force-clear signal from decoder 118 coincident with a search mode signal from terminal programmer 120. Randomization is accomplished by a multivibrator operating at approximate 1 Hz within the randomizer 137 and with approximately a 10 percent duty cycle to a positive gating signal from the multivibrator. Only during the positive gating signal from the multivibrator in the randomizer 137 is the time slot buffer 126 enabled by the randomizer 137 to accept the count of the time slot counter 124 upon the occurence of an idle signal. The out of sync frequency of the 1 Hz multivibrator causes the ten percent duty factor positive gating signal to occur at a different point or points in the time block of the most strongly received station. To prevent coincident time slot capture attempts, the multivibrator in the randomizer 137 can be made relatively inaccurate in frequency regulation and/or provided with an external control for variation of the multivibrator frequency by the vessel operator if failure to capture a time slot persists. When no incorrect identifier acknowledgement or force-clear signal has been received the randomizer outputs a steady positive gating signal to continuously enable the buffer 126.

Once a vessel has been assigned a specific time slot, data exchange between vessel and communication station over that time begin.

It can now be understood how the averaging interval signal is developed by the terminal programmer 120 and communicated to the phase averager 98 over line 100. The terminal programmer 120 receives the 10.2 kHz rate pulses from the time slot counter 124 and accumulates these pulses for a selected count substantially equal to the time of Omega transmission in each time block. Proper synchronization with the beginning of each one and one quarter second time block is obtained by synchronizing the count in the terminal programmer 120 to the reset of the time slot counter 124. The averaging interval is a window established by the count in the terminal programmer 120 being a selected number of counts from both beginning and end of a time block to prevent propagation delays from causing no Omega signal, or two different Omega signals from being received at the vessel-located terminal during any given averaging interval.

From the time of assignment of a given time slot by reception of a terminal identifier acknowledgement the operation of the vessel-located circuitry of FIG. 5 is under the control of messages received from the computation center 30 via the fixed communication station.

Initially, after receipt of an identifier acknowledgement, the terminal transmits a phase calibration measurement in the assigned time slot until an acknowledgement is received from the computer of this measurement with instructions to continue. The phase calibration signal is obtained by inverting the gating sense of the phase detector 96 exactly midway in the phase measurement process of a given Omega station. Coincident with reception of an identifier acknowledgement code from control circuit 132, the programmer 120, midway in its count of the preselected interval for the averaging interval signals the phase detector 96 to effectively invert the signal from the gating circuit 90 thereby passing pulses from the reference oscillator 94 to the phase averager 98 at a rate indicative of a phase measurement complimentary, modulo 360°, with the measurement in the previous half of the interval. At the end of the averaging interval the count accumulated in phase averager 98 should indicate exactly a 180° phase measurement. Any deviation from that count in phase averager 98 is indicative of the amount and direction of frequency deviation of reference oscillator 94. At the end of each averaging interval during this phase calibration period the phase data storage circuit 104 is enabled to receive the accumulated count in phase averager 98 and the scanner circuit 134 is enabled by terminal programmer 120 to pass this data from circuit 104 to transmitter buffer 116 for transmission to the communication station during the next assigned time slot.

By using the above-described phase calibration measurement system a reference oscillator having a long-term frequency accuracy of only 20 parts per million may be used.

After the transmission of the phase calibration measurement a hold message received by the vessel-located terminal indicates and is interpreted by the terminal as a request for the terminal to transmit an indication of the frame of reference selected for vessel position information. The vessel operator has the opportunity for selecting any number of reference frames within which the calculated position is displayed, including latitude and longitude, range and relative bearing to any one of several selectable landmarks identified by number, or any other numerically identified reference frame. A reference frame and landmark selection is made through selector switches 140 by positioning them to indicate the number identifying the particular reference frame desired. The number selected is formed into a digital data word and communicated through the scanner circuit 134 by programmer 120 for transmission to the communications station each time the hold message is detected by decoder 118.

In order to prevent faulty switch operation from resulting in misleading position data a specific arrangement is preferred for forming the data words representative of the numbered reference frame selection. In particular FIG. 6 indicates the electronics and switching pattern for one of four reference frame selector switches used in forming the data word representative of reference frame selection. A decade counter 139 repetitively counts through the ten binary states of four flip-flops wired for a 10 count at a greater than 100 kHz rate. The binary states are inputted to a BCD decoder 141 which converts the binary states into a single pulse on the corresponding one of ten output lines to ten selectable terminals 0-9, of a switch 143. The pointer of the switch 143 is connected to one of the ten terminals to indicate one of the four numerals of the selected reference frame. As the particular contact to which the pointer of switch 143 is connected receives a pulse, multiplex gate 145 transfers the state of the four binary stages in decade counter 139 to the transmitter buffer 116 for storage and switches to the next switch in the sequence of four. The terminal programmer 120 detects when all four switches have been read and the binary coded numbers transferred to transmitter buffer 116; and then enables the transmitter buffer 116 to transmit this data in the next occurring assigned time slot for the particular vessel.

Figure 6:
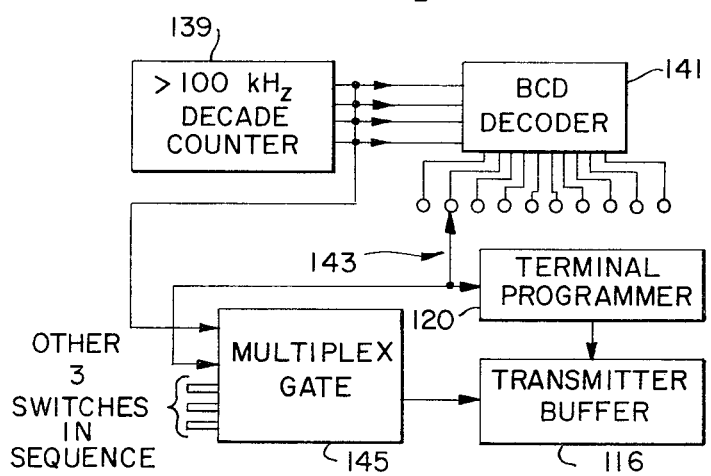
FIG. 6 is a block diagram and partial schematic representation of a portion of a reference frame selector switch.

The particular reference frame selection system of FIG. 6 requires that all switches be operable at least in the position selected for a pulse to appear at the multiplex gate 145 and for data to be stored in transmitter buffer 116 and eventually transmitted to the communication station. In the absence of a proper switch operation no data will be transmitted and no erroneous positions can possibly be generated. The computation center 30 by detecting the failure of a communication station to receive a reference frame selection in binary form when it should appear in any partiuclar time slot can use this information along with the vessel identifier previously exchanged between vessel and communication station to detect faulty switch operation and notify, by mail or other means, the owner of the identified terminal of the problem.

After the communication station receives data representing the requested reference frame for position information a series of phase measurements will be requested of the vessel. In the preferred embodiment this request is conveyed implicitly by failure of the decoder 118 to detect any of the explicit control signals such as hold, idle, terminal identifier or force-clear.

The request for phase measurements as thus detected causes the terminal programmer 120 to initiate a normal averaging interval in the time block directly following the time block used for communication. The phase data generated during each phase measurement will be transmitted in the next occurring time block used for communication. The terminal programmer will continue this process until a further request for transmission of a selected reference frame, a force-clear is received, or until the operator shuts down the terminal.

As indicated in FIG. 4, each time block is time synchronized with the transmission pattern of the Omega chain so that the averaging interval can be selected at a specific portion of the count of the time slot counter 124 during which the terminal programmer 120 enables the phase averager 98 to accumulate counts at a rate indicative of the phase difference between the frequency of the reference oscillator 94 and the received Omega signal. Because the five time blocks of the communications system are synchronous with the eight time blocks of the Omega transmission plan, every fifth succeeding communication time block will correspond to a different Omega station until, after eight transmission periods of the communication station the pattern will repeat. Therefore, phase measurements of a given Omega station are reported at intervals of 40 time blocks.

Subsequent phase reports, beyond the first 40 time blocks, correspond to up dated phase measurements for Omega stations previously reported and provide a means for indicating short term phase drift in the reference oscillator 94. Assuming a linear phase drift characteristic, the computation center 30 can compensate for this linear phase drift provided it has not exceeded one half cycle during forty time blocks. This requirement corresponds to a frequency accuracy of one part per million. As mentioned previously, however, reference calibration transmissions performed at the point of time slot seizure permits the oscillator frequency accuracy to be relaxed to 20 parts per million since the number of cycles of drift in forty time blocks is thereby ascertainable.

In addition to linear phase drift it is necessary to consider the phase jitter of the oscillator. To provide a theoretical accuracy of one hundred feet error, the RMS phase jitter should not exceed 0.1 microsecond in 40 time blocks. This jitter performance, and the other above mentioned accuracy limitations, are, however, readily obtainable with inexpensive oscillators.

Thus the above system provides a means for accurate phase measurements on board a vessel without the need for expensive reference oscillators and allows transmissions of the phase information in a shorter time period than by retransmission of the signals being phase differenced.

As each phase measurement is made, the data representative of the phase difference is stored in the phase data storage circuit 104 for subsequent transmission during the next succeeding time slot assigned to the vessel. The scanner 134 upon command from the terminal programmer 120 extracts the data in the phase data storage circuit 104 and feeds it to the transmitter buffer 116 in transmitter 112 for transmission with appropriate setting of the duplexer 108.

Once all the necessary phase measurements have been accumulated at the computation center 30, via a communication station, the vessel's position is computed in the coordinate frame designated by data received in response to a request for the selected reference frame. The computer transmits a formated display message corresponding to the vessel's position to the vessel via the communication station with an indication that the accompanying data is display information. In the preferred embodiment this indication is implicit by means of the failure of decoder 118 to detect any of the explicit control codes in the presence of other data. When this situation is interpreted by the call progress control circuit 132 the terminal programmer 120 is signalled to enable a message display unit 142 to receive position (or other) data from the receiver buffer 114 and display it in a form readily understood by the vessel operator.

Figure 7:
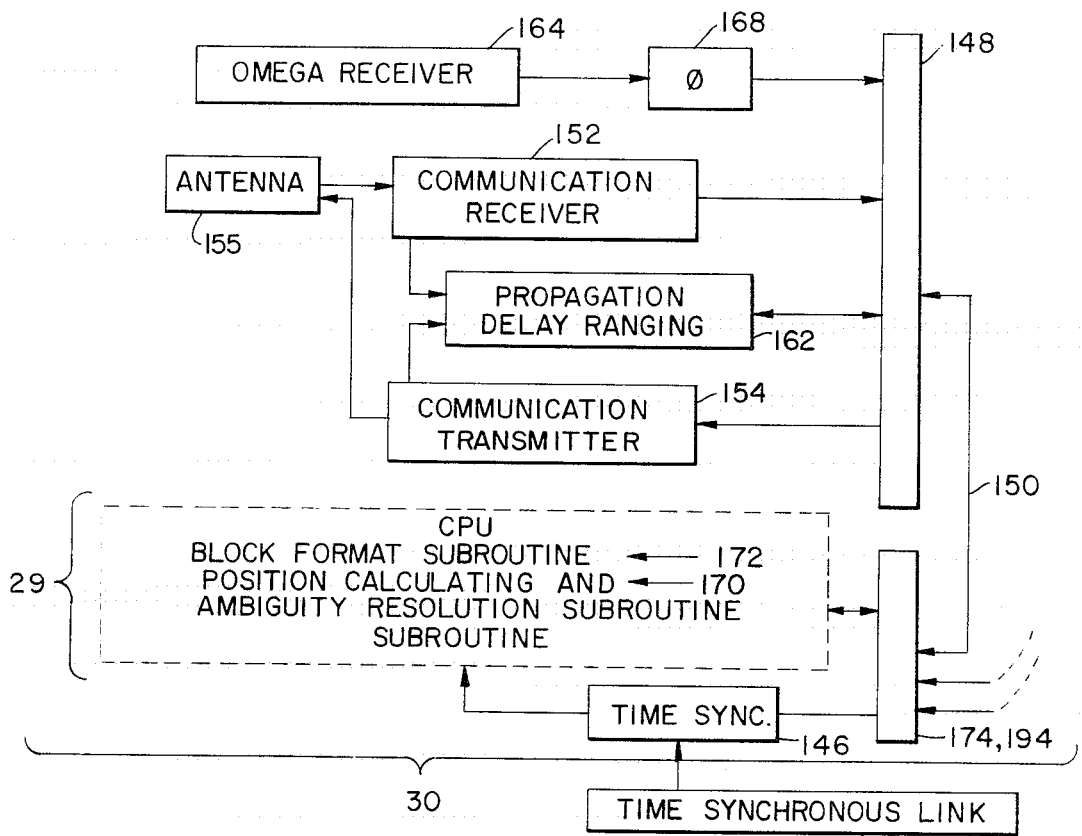
FIG. 7 shows a block diagram of the electrical equipment used according to the invention at each fixed communication station.

Having just described a vessel based data communications transceiver and Omega broadcast phase measuring system according to the invention, it is now appropriate to turn to a description of the shore facilities comprising a fixed communication station and a computation center as shown in FIG. 7.

A time synchronous link 144 which consists of the 10.2 kHz VLF transmission of one of the Omega stations provides the master time reference for the computation center 30. A time synchronizer 146 at the computation center 30 receives universal time from the synchronous link 144 and provides a time base at the computation center 30. This time base is transmitted over a land-line data link 150 (normally telephone lines) to the fixed communication stations implicit in bit rate. Additionally a synchronizing code word is transmitted to indicate to the appropriate communication station the beginning of its time block. Block synchronization may be achieved by using a separate line 150 for each communication station and transmitting a block synchronization code word only over the lines 150 for the group to which it applies.

Data composers and buffers 148 receive the transmissions over each data link 150 at 1.224 kHz, a subharmonic of 10.2 kHz, and provide storage and speed buffering to accommodate the 10.2 kHz VHF bit rate used in communication with a vessel. The 1.224 kHz bit rate also provides synchronization for a 10.2 kHz oscillator within the buffers 148. This oscillator provides the actual time base for modulating the VHF transmissions.

Within each fixed communication station a hard-limiting F.M. communication receiver 152 and an FM communication transmitter 154 are provided for respective data reception and transmission via an antenna 155. The communication receiver 152 feeds data to the data composers and buffers 148 while the communication transmitter 154 receives data from the composers and buffers 148 in a proper timing sequence for transmission in hte correct time slots.

A propagation delay ranging circuit 162 is fed the transmitted data and the received data from the communication transmitter 154 and receiver 152 respectively. The propagation delay ranging circuit 162 determines the time difference between the transmitted and received bit streams of each time slot. Because the system on each vessel synchronizes its bit transmission within a few micro-seconds of the received bit phase, the time difference between the reception of each vessel's transmission and the beginning of each vessel's assigned time slot as measured by the communication station's 10.2 kHz oscillator in buffers 148 is indicative of the round trip propagation delay from fixed station to vessel to fixed station. The propagation delay ranging circuit 162 detects this time difference as a binary count and feeds it to the data composers and buffers 148 for data transmission over the land-line data link 150 to the computation center 30 as soon as a vessel begins communications.

Data fed into the buffers 148 from the communication receiver 152 is stored by block for an available time period for transmission to the computation center 30. Each transmitted block of stored data is prefaced with a synchronizing code to indicate the beginning of a block and all subsequent data transmitted in each block is organized in units corresponding to the data from each time slot received during that time block with each unit transmitted in the order in which the corresponding time slot was received. The computation center 30 can thus correctly correlate all data received over data link 150 with particular time slots and the corresponding vessels assigned those time slots. Likewise data received by the buffers 148 from the computation center 30 over data link 150 is organized and coded in a manner similar to the data sent to the computation center 30 to indicate a particular count in the oscillator of buffers 148 for transmission via the transmitter 154.

Many (but not necessarily all) of the fixed communication stations have a VLF Omega receiver 164 and phase measuring circuit 168 which are substantially identical to those employed on each vessel to perform the functions of the Omega phase measurement. In this manner continuous localized Omega phase measurements are fed to the buffers 148 from the phasing circuit 168 and are periodically transmitted via the data link 150 to the computation center 30 during a prearranged time devoted to reference phase reporting.

Within the computation center 30 the central processing unit 29 performs the position calculations by well known mathematical techniques as part of a position calculation subroutine 170 and resolves ambiguities on the basis of range by the subroutine 170 performing a coincidence detection fucntion as indicated by FIG. 3.

The CPU 29 is also programmed to provide bookkeeping functions to insure that each information and control signals are received and transmitted for the correct vessel and that during internal processing of the data it maintains its identity as belonging to a particular vessel. To achieve this a block format subroutine 172 is programmed into the CPU 29. The block format subroutine 172 controls indexing and content of all data transmitted over a land-line data links 150 and routes all incoming receive data in accordance with its nature.

Figure 8:
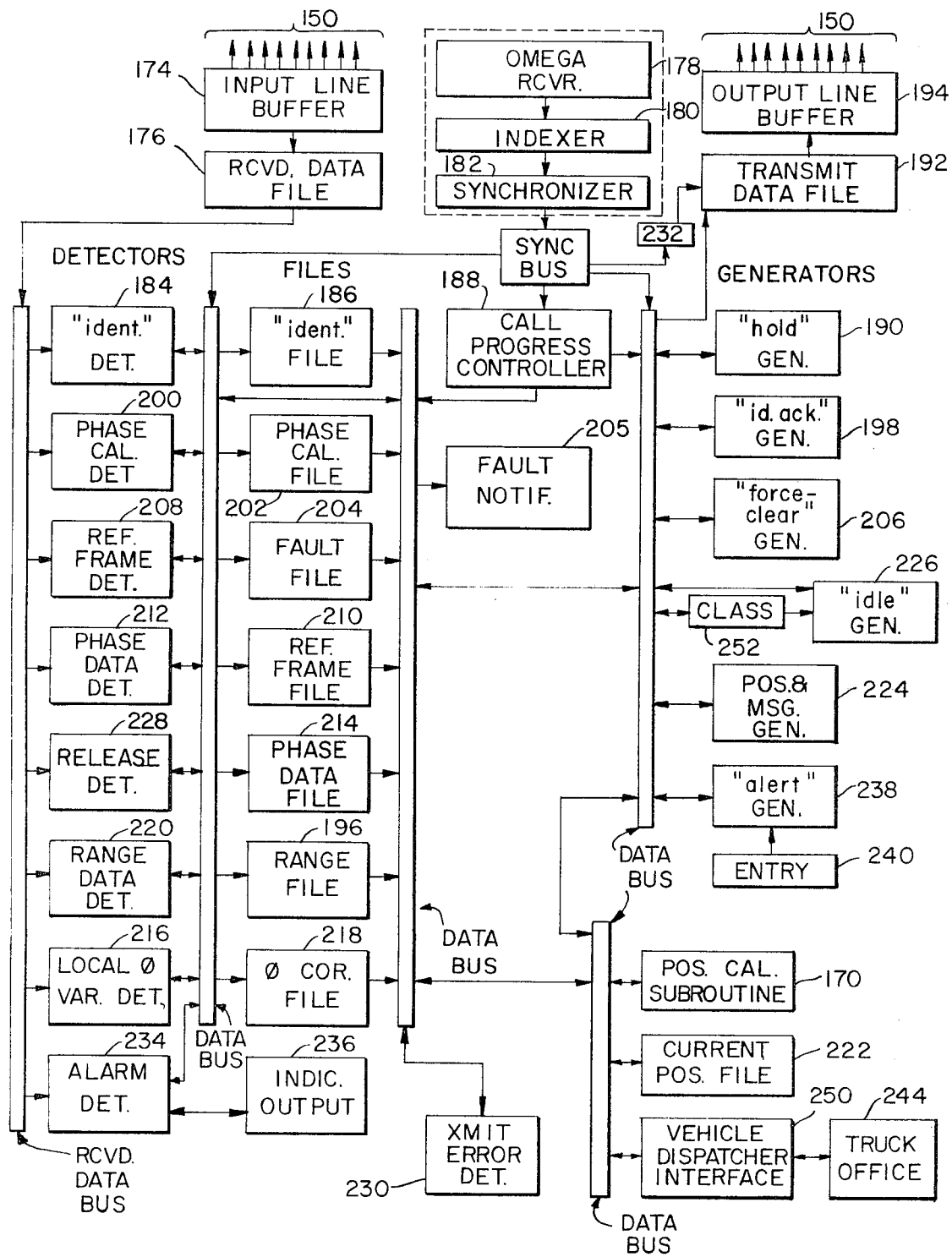
FIG. 8 is a flow and data control chart of a data handling subroutine employed in the invention.

FIG. 8 presents a functional organization diagram indicating the operation of the block format subroutine 172. An input line buffer 174 receives data from the several communication stations via a separate data link 150 for each communication station. As mentioned above the data is transmitted from each communication station block-by-block with the data from each time slot transmitted to the computation center in the same sequence in which it was received at the communications station. The input line buffer 174 provides for storage of the incoming data in a received data file 176 with proper time slot and data link indexing to indicate the specific time slot and specific communication station at which the data was received. This indexing function is accomplished through the synchronizer 146 composed of a master Omega receiver 178 feeding an Omega station indexer 180 which marks the beginning of each time block and each time slot so that a synchronizer 182 can correlate the incoming data in the buffer 174 with the appropriate time block and time slot and provide indexing for the data in the data file 176. The synchronizer 182 also provides time base indexing pulses for the data processing steps of the block format subroutine 172 to correlate each step with the correct data.

The appearance of an identifier code in the data file 176 indexed to a particular time slot and communication station is detected by an identifier detector 184 which responds by storing the detected identifier in a vehicle identifier file 186. The appearance of this identifier at the data file 176 is detected by a call progress controller 188 which in turn enables a hold code generator 190 to provide a hold signal to a transmit data file 192 with proper time slot and communication station indexing for subsequent outputting through an output line buffer 194 to the appropriate data link 150 with appropriate time slot indexing. The vehicle identifier is received in the data file 176 in subsequent appearances of the same time slot index, and each time the hold generator 190 provides a hold signal response until the vehicle identifier detector 184 has authenticated the vehicle identity. The process of authentication includes reception of the same identifier at least twice in succession and a scan of the identifier file 186 to verify that the same identifier appears only once under the same indexing in the file 186. If more than one appearance of the same identifier is detected as could occur when more than one communication station receives the same identifier from the same vehicle the identifier detector 184 clears all identical identifiers from the file 186 except for the one having the smallest idicated range between vehicle and communications station as disclosed by a range file 196 discussed later. Once authentication of a vehicle identifier in a particular time slot at a specific communication station is established, this is detected by the call progress controller 188 and an acknowledgement generator 198 is signalled to compose an identifier acknowledgement including the specific identifier for repeated transmission via the transmit file 192 and buffer 194 on data lines 150 with appropriate time slot indexing to the proper communication station.

When the vessel responds to the identifier acknowledgement by transmitting a phase calibration measurement of the vehicle's reference oscillator a phase calibration detector 200 receives this data from the received data file 176 and stores it in a calibration file 202 with proper time slot and communication station indexing for later use by the position calculating subroutine 170. If no phase calibration measurement is received or if the measurement received by the phase calibration detector 200 indicates that the vessel's reference oscillator is out of specification, a fault file 204 receives data indicating a specific fault at a specific indexing as well as the corresponding identifier from the file 186 so that the particular vehicle involved can be identified and its owner notified of the defect by a fault notification operation 205.

When the phase calibration detector 200 detects either no signal or an out of tolerance phase calibration measurement a "force-clear" generator 206 is triggered through the call progress controller 188 to transmit a force-clear code with appropriate indexing via the file 192, buffer 194, and a data link 150. In the event that a phase calibration measurement as detected by the detector 200 is within tolerance the call progress controller 188 is signalled causing it to initiate a hold signal from the hold generator 190 with proper indexing for transmission to the appropriate communication station in the correct time slot.

The hold code transmitted to a vessel in response to a proper phase calibration measurement causes transmission from the vehicle of the data entered in its reference frame selector switches 140. This data when received in the data file 176 is detected by reference frame detector 208 and filed in reference frame file 210 with appropriate indexing for use by the position calculating subroutine 170. In the absence of proper selector switch data, the reference frame detector 208 signals this condition to the fault file 204 with appropriate indexing and signals the call progress controller 188 to initiate a force-clear signal from the force-clear generator 206. The fault notification operation 205 is initiated to notify the vessel operator.

When proper reference frame date is detected, the call progress controller 188 is signalled to delete all control codes from the corresponding index which is interpreted by the vehicle as a request for transmission of Omega station phase measurements. When phase data is received in the received data file 176 a phase data detector 212 receives that data and stores it in a phase data file 214 with appropriate indexing for use by the position calculating subroutine 170. The phase data file 214 will contain a series of phase measurements including more than one phase measurement corresponding to each of up to eight Omega stations.

An area propagation variation detector 216 receives from the received data file 176 the Omega broadcast phase measurements from the communication stations having Omega receiving and phase detection equipment and files them in a phase correction file 218 with proper indexing to indicate the communication station to which each set of data applies. The position calculating subroutine 170 calls upon this data in making the position calculation.

A range data detector 220 receives the range information as supplied from each communication station for each individual vessel from the start of communication with each vehicle and files it in range file 196 with proper indexing to indicate the vehicle it refers to so that the position calculating subroutine 170 can call upon that data for each vehicle's position calculation to resolve ambiguities using mathematics to perform the functions indicated in FIGS. 2 and 3.

When a predetermined amount of phase data for a given index is accumulated in the file 214, the position calculating subroutine 170 enters this data into its calculating routine and performs the position calculation in the particular reference frame indicated under the same index in the file 210. Reference oscillator gross error corrections are obtained from the phase calibration file 202 and fine corrections obtained from the successive measurements in the phase data file 214. Data in range and propagation variation files 296 and 218 are entered into the routine 170 as well. Under the control of the call progress controller 188 the calculated position data from the position calculating subroutine 170 is fed to a current position file 222 and composed in a position and message generator 224, then sent to the transmit file 192 preserving the appropriate index for transmission via the output line buffer 194 over the appropriate data link 150 and the appropriate time slot.

Position information may be repeatedly calculated at predetermined intervals as data is continuously accumulated in the phase data file 214. Periodically, such as after each set of position data is transmitted, a further hold message may be commanded by the call progress controller 188 to initiate a further transmission by the appropriate vehicle of its reference frame data.

If at any point the data ceases to be detected by the subroutine 170 at any index position the call progress controller 188 is signalled to provide a force-clear from the force-clear generator 206 with the corresponding indexing. Whenever the call progress controller initiates a force-clear transmission it thereafter signals an idle marker generator 224 to provide an idle marker in the particular time slot of the specific communication station which transmitted the force-clear signal.

A force-clear condition is also initiated when a release detector 228 detects any of several conditions including a high noise rate in the data in received data file 176, a calculated position which places the vehicle outside the range of the particular communication station through which data is exchanged, or a high error rate detected on the communication path. A transmission error detector 230 is provided to monitor the indicated phase drift from repeated phase measurements of the same Omega station in the phase data file 214 and compare it to the corresponding indexed data in the phase calibration file 202. When an inconsistency between these two inputs of the transmission error detector 230 is found this is interpreted as a communication path error and the release detector 228 is so signalled. In the event of any of these three conditions, the release detector 218 initiates a force-clear through the call progress controller 188 resulting in the transmission of a force-clear signal at the appropriate time slot and communication station.

The transmission sequencing of the output line buffer 194 is under the control of an indexer 232 synchronized to the Omega frequency by receiving pulses from the Omega station synchronizer 182. The indexer 232 provides the time base to the output buffer 194 for the generation of block synchronization transmissions at the beginning of each time block and correct data sequencing in each block of each data link 150 based upon the indexing of data in the transmit data file 194.

An alarm detector 234 receives alarm messages from the received data file 176 and in conjunction with the vehicle identifier file 186 provides distress information referenced to the distressed vessel in an indicator 236 to attract the attention of appropriate personnel for insuring a responsive action. The data in the current position file 222 provides updated position information on all vehicles having an identifier in the file 186 and allows the alarm detector 234 to display through the indicator 236 the current position of the distressed vessel upon the detection of an alarm from that vessel.

An alert generator 238 responding to alert data entered through a keyboard 240 provides transmission of alert messages via the transmit file 192 to either specific vehicles having an identifier in the file 186 or to a class of vehicles based upon their location provided by the current position file 222 or based upon any other common denominator indicated by entry through the keyboard 240. The vehicle may further comprise means 138 for transmitting a current known position for that vehicle to said communication station whereby a last known position is established.

The position locating system described above may also be applied to locating the position of land-based vehicles 242 in FIG. 1 such as each truck in a fleet. In this case it is adequate to have each truck periodically seek and obtain a time slot for transmission of phase measurements so that the computation facility will have a periodic record of the position of each truck which can be forwarded to a trucker's office 244. For this purpose a counter 246 is provided to receive the idle signals from the decoder 118 and pass to every Nth signal to the programmer 120 through a switch 248 which is normally open but must be closed to achieve the truck locating function. The counter 246 selects a specific number (N) of idle signals as the basis for periodic requests for time slot assignment. After the specific number (N) of idle signals, the counter 246 enables the terminal programmer 120 to begin the normal sequence of circuit operations which the vehicle operator would otherwise initiate through the terminal programmer 120 by switching on the circuitry.

In this manner the capacity of the truck locating system is greatly increased by having each truck call in only periodically with the time between requests depending upon the number of idle signals received and thus the total traffic density of its selected time block. As the number of trucks for a particular communication station increase the time between each truck's checking-in increases allowing in theory an infinite number of trucks for each communication station.

The terminal programmer 120 upon closure of switch 246 is further controlled by means of the force-clear message from the central processor to transmit only a sufficient number of phase measurements to afford a position fix. The reception of the force-clear message then shuts down the terminal until another signal from the counter 246 is received to recommence the entire procedure. Preferably the number of phase measurements transmitted would include at least nine so that all Omega stations may be sampled once and at least one station sampled twice to provide the basis for estimating the phase drift of the reference oscillator 194. However for vehicle location applications where great precision is not required a single phase measurement corresponding to each of three Omega transmissions is adequate. In this way the duration of each communication necessary for a position determination is reduced permitting a greater frequency of reporting by a greater number of vehicles.

In place of a reference frame selection by each truck 242, the selector switches 140 of FIG. 5 can be replaced by a data entry keyboard as unit 140 whereby the truck operator can enter information on his status such as loads received and delivered and next destination. This information is then communicated to the computation center 30 in place of a reference frame request, and ultimately communicated to the trucker's office 244.

Vehicle locations are provided to the truck office 244 and information and status messages are exchanged between the dispatcher and individual vehicles through a vehicle dispatcher interface 250. Vehicle dispatcher interface 250 receives requests for the position and status of particular vehicles from truck office 244 and scans the identifier file 186 for the vehicle identifier number and then requests current position data from the current position file 222 based upon the identifier index in the file 186. This position information is then conveyed to the truck office 244 through the vehicle dispatcher interface 250. The vehicle dispatcher interface 250 also receives messages from the truck office 244 and scans the identifier file 186 to locate the proper indexing for the identifier associated with the message. With the appropriate indexing the messages are conveyed to the transmit file 192 for appropriate time slot sequencing on the appropriate data link 150. Through the buffer 194. The position message generator 224 performs the appropriate coding and data formatting of the message from the vehicle dispatcher interface before it is conveyed to the transmit file 192.

Status messages received from the vehicles are stored in the reference frame file 210 in accordance with the earlier described operating procedures of the central processor 30. The reference frame file 210 contains the status data properly indexed as it is received from vehicles pursuant to a request in the nature of the hold signal whenever each truck periodically communicates with a communication station. The status data is sent to each truck office 244 via the dispatcher interface 250 along with position data each time that a request is presented to the interface 250. Correlation between vehicle and index position is obtained through the identifier file 186.

Water and land based vehicle locating functions can be combined into a single system with each type of vehicle receiving data by apportioning time slots among several classes of vehicles including the trucks and vessels. The computation center 30 operates to provide uniquely different idle markers in time slots reserved for each class of vehicles by a class indexer 252 indicating to the idle generator 226 the appropriate idle marker to generate based upon the indexing accompanying the command for an idle marker from the call progress controller 188. The number of slots available for each vehicle class can be tailored to the demand by having the class indexer 252 respond and scan identifiers filed in the file 186 to detect when a particular class of vehicles requires more time slots in a particular area served by nearby communication stations. This adaptability is particularly useful during emergency traffic loads, such as fog conditions. Provision is made in the class indexer 252 and the call progress controller 188 to enter an emergency condition signal which requires the call progress controller 188 to initiate the generation of a force-clear signal in all index positions other than those reserved to the class having the emergency and sets the class indexer 252 to provide only idle markers of one class designation, such as ocean vessels.

Within the vehicle located equipment of FIG. 5 each buffer 126 and call progress controller 132 is set to recognize and to respond to only one type of idle marker depending upon the class of vehicle in which it is located when a multiclass system is operated.

Having above described a preferred embodiment for accomplishing the position locating function of this invention, it will appear to those skilled in the art that other circuitry and other operating sequences may be used to accomplish the same goal as this invention, staying within its spirit and scope.

Accordingly, it is intended to define the spirit and scope of the present invention only as specified in the following claims.

What is claimed is:

1. A position locating system for a plurality of movable vehicles operating in cooperation with a system of radio beacons transmitting phase synchronized signals comprising:
at least one communication station of known geographical position;
means for receiving radio beacon transmissions at each said vehicle;
a reference frequency source at each said vehicle;
means at each said vehicle for detecting the difference in phase between said reference frequency and a plurality of received beacon signals over an interval;
said detecting means including means responsive to detected phase differences for developing data which in combination represents phase differences between said plurality of received beacon signals;
vehicle data transmission means at each said vehicle for transmitting said data representing the phase differences to one of said at least one communication station;
said data being in a form to permit transmission thereof in a substantially shorter time than said interval;
station receiving means at said at least one communication station for receiving vehicle phase data; and
means available to said at least one communication station for calculating at least one possible vehicle position corresponding to phase data received from each vehicle.

2. The position locating system of claim 1 further comprising:
station transmitting means at each of said communication stations for transmitting to a vehicle data representative of its calculated position; and
vehicle data receiving means at each of said vehicles for receiving position data and indicating the vehicle's position therefrom.

3. The position locating system of claim 1 wherein the calculating means available to each said communication station comprises a time-shared central processing unit performing position calculations over a data link from phase data received at a plurality of said communication station.

4. The position locating system of claim 1 wherein at least some of said communication stations are further characterized by having:
means for receiving transmissions of said beacons;
means for detecting the phase relationship of said received beacon signals;
means for communicating the station detected phase relationship to said calculating means; and
said calculating means are adapted to compensate for propagation variations in said beacon transmissions as received at each said communication station and adapted to adjust for said propagation variations in the positions calculated from phase data received by that communication station.

5. The position locating system of claim 1 wherein said calculating means is adapted to calculate the position of each vehicle transmitting phase data in one of a plurality of selectable reference frames.

6. The position locating system of claim 5 wherein each said vehicle has means for selecting one of said plurality of reference frames for the calculation of position and for cummunicating the selection as a reference frame request data word to said calculating means via a communication station.

7. The position locating system of claim 6 wherein said means for selecting one of said plurality of reference frames comprises:
a plurality of reference frame indicating switches; and
means for composing said reference frame request data word representing the selected reference frame in response to the condition of each said reference frame indicating switch;
each said switch providing electrical conduction through a selectable contact which conduction causes said reference frame request data word to be composed.

8. The position locating system of claim 7 wherein:
each said communication station has means for transmitting data to a plurality of vehicles; and
said calculating means is adapted to cause transmission to a predetermined vehicle of a request for a selection of reference frame via a communication station and upon failure to receive a reference frame request data word from said predetermined vehicle is adapted to terminate communication with said predetermined vehicle and to notify said predetermined vehicle of said failure.

9. The position locating system of claim 1 further including means for resolving vehicle position ambiguity comprising:
means associated with said communication station for measuring the propagation delay between a communication station and one said vehicle from which the distance between said communication station and said vehicle can be estimated to define an approximate locus for each said vehicle consistent with a limited number of possible positions; and
means within said calculating means responsive to said measured propagation delay for eliminating as possible positions all possible positions inconsistent with said approximate locus.

10. The position locating system of claim 1 including means for resolving vehicle position ambiguity by selecting as each said vehicle's exact known position the calculated position geographically closest to that vehicle's last known position.

11. The position locating system of claim 10 wherein each said vehicle further comprises means for transmitting a current known position for that vehicle to said communication station whereby a last known position is established.

12. The position locating system of claim 1 wherein:
said calculating means is adapted to transmit alert messages in response to an alert condition to selected vehicles via a communication station; and
means are provided at each said vehicle to receive and indicate said alert messages.

13. The position locating system of claim 1 wherein said vehicle transmission means are adapted to transmit vehicle status data via a communication station to said calculating means to provide said calculating means with status data from a plurality of vehicles.

14. The position locating system of claim 1 wherein said vehicle means for transmitting phase data are further adapted to be activated periodically with an intervening inactive period.

15. The position locating system of claim 1 wherein said means for detecting phase differences further includes:

means for selectively inverting said reference adapted to maintain the phase of said reference at least 90° out of phase with each received beacon signal;

means for counting at a predetermined rate during the time when said selectively inverted reference and each received beacon signal are of the same given signs over a preset time period during reception of each received beacon signal to produce an accumulation of counts representing phase differences averaged over said preset time period; and means for adjusting said accumulation of counts for the selective inversion of said reference with said phase data representing said adjusted accumulation of counts.

16. The position locating system of claim 15 wherein:

means associated with said communication station are provided for causing each said communication station to transmit a request for reference calibration data;

vehicle located means are provided for initiating a calibration period in response to a received request for reference calibration data;

said means for counting is adapted to count during said calibration period at said predetermined rate when said selectively inverted reference and received beacon signal are coincidentally of the same given signs over an interval defined by the first half of said preset time period and to count at said predetermined rate when said selectively inverted reference and received beacon signals are coincidentally of the opposite sign over an interval defined by the second half of said preset time period whereby the accumulated count during said calibration period deviates from a determined count by an amount indicative of long term reference frequency error;

said vehicle data transmission means is adapted to transmit the accumulated count during said calibration period;

said means for detecting phase differences is further characterized by being adapted to detect phase differences for a sequence of received beacon signals from different beacons with at least one set of at least two phase differences detected for the same beacon at different times, whereby differences in phase data for two measurements of the same beacon signal in conjunction with said calibration period accumulated count represents reference frequency error relative to the common frequency of said radio beacons; and said means for calculating position is responsive to the difference in phase data for the same beacon signal and said calibration period accumulated count from each vehicle as received by a communication station to compensate for reference frequency error in the calculated position for each vehicle.

17. The position locating system of claim 1 wherein: said means for detecting phase differences is adapted to detect phase differences for a sequence of received beacon signals from different beacons with at least one set of at least two phase differences detected for the same beacon at different times whereby differences in phase data for two measurements of the same beacon signal represent reference frequency error relative to the common frequency of said radio beacons; and said means for calculating position is adapted to compensate for reference frequency drift determinable from the difference in phase data for each set of beacon signals.

18. The position locating system of claim 1 wherein said plurality of vehicles includes vehicles of at least two different classes with at least one of said classes having its data transmission means adapted for automatic periodic transmission of phase data representing phase differences to one of said communication stations with a substantial period between each automatic transmission.

19. The position locating system of claim 1 wherein:

said calculating means is further adapted to assign each of said communication stations a specific time block in a periodic communication plan;

each said time block being divided into a plurality of time slots with each time slot adapted for data communications between a communication station and a single vehicle;

each said vehicle data transmission means is adapted to seek assignment from said calculating means of an unused time slot associated with a nearby communication station for data exchange with that vehicle; and said calculating means is adapted to assign a requested time slot to the requesting vehicle.

20. The position locating system of claim 19 wherein:

at least two classes of vehicles exist; and said calculating means are further adapted to transmit indications of idle time slots via said communication stations with a further indication in each said idle time slot that it is available for communication with only one class of said vehicles with said idle time slots divided among the vehicle classes.

21. The position locating system of claim 20 wherein vehicle data transmission means of at least one class of said vehicles are adapted to count the number of idle time slots indicated for use by said at least one class in the time block of a nearby communication station after each transmission of phase data and to commence seeking assignment of an idle time slot for data transmission automatically after a preselected count of the idle time slots for that class of vehicles whereby said at least one class maintains automatic periodic data communication with a nearby communication station.

22. The position locating system of claim 20 wherein said calculating means is further adapted to terminate the assignment of each vehicle of at least one class during predetermined emergency conditions whereby all unterminated class vehicles may have all time slots available for their use during said predetermined emergency conditions.

23. The position locating system of claim 19 wherein:

said calculating means is further adapted to inhibit assignment of a specific time slot to a requesting vehicle and to terminate the assignment of any vehicle in the presence of noise, a weak signal and interference in that time slot as received by a communication station; and each said data transmission means on each said vehicle is further adapted to randomly select another idle indicated time slot in that time block for subsequent transmission of a request for assignment after it is inhibited from being assigned an idle indicated time slot.

24. The position locating system 23 wherein all data transmission is via FM modulation and all data reception is by hard-limiting FM detection.

25. The navigation system of claim 19 wherein:
said calculating means are adapted to transmit indications of idle time slots via said communication stations; and
said vehicle data transmission means are adapted to count the number of idle time slots in the time block of a nearby communication station after each transmission of phase data, and to commence seeking assignment of an idle time slot for data transmission automatically after a preselected count of the idle time slots.

26. A position locating system for a plurality of movable vehicles comprising:
at least one communication station of known geographical position;
a plurality of radio beacons phase synchronously transmitting the same precisely controlled common frequency signal during a portion of different time block assignments in a transmission cycle;
means for receiving radio beacon transmissions at each said vehicle;
a reference frequency source at each said vehicle;
means at each said vehicle for detecting the difference in phase between said reference frequency and a plurality of received beacon signals;
vehicle transmission means at each said vehicle for transmitting data representing the detected phase differences to one of said communications stations and for transmitting a communication request;
station transmitting means at each said communication station for transmitting data;
station receiving means for receiving data transmissions from said vehicles;
vehicle receiving means at each said vehicle for receiving data transmitted by communication stations;
first and second means respectively associated with said vehicles and said communication stations for controlling the data transmitting and receiving means respectively of said vehicles and said communication stations to provide two way communication between a vehicle and a communication station during one of a plurality of time slots in a periodic time block assigned to each communication station, and to assign a vehicle a time slot not then in use whenever that vehicle requests communication;
said means controlling said vehicle receiving and transmitting means being adapted to cause transmission from said vehicle only in its assigned time slot and to establish the time of its assigned time slot in predetermined relationship with the time of receipt of data at a vehicle;
means available to each said communication station for measuring the time of reception of data relative to its time for transmission, said time of reception representing the propagation delay between said communication station and each vehicle communicating with it; and
means available to each said communication station for calculating a vehicle position corresponding to phase data received from each vehicle at a communication station and corresponding to the time of reception of data from that vehicle indicative of the distance between the communicating vehicle and communication station.

27. A time shared system for locating the position of a plurality of vehicles by comparing signals received at each vehicle from a plurality of radio beacons on a common frequency comprising:
a plurality of communication stations at known geographical positions, said communication stations having data transmitters and receivers on at least one assigned frequency;
means at each said vehicle for data receiving and transmitting on said at least one frequency assigned to said communication stations;
said plurality of communication stations being subdivided into groups of at least one station each with each said group having assigned to it a unique block of time in a periodic transmission time plan which block differs from the block of time assigned to all stations in other groups;
each time block being subdivied into sequential time slots with each slot adapted for time-shared data communications between a single communication station and a single vehicle;
each station of a given group being geographically positioned to provide an area of communication coverage at any point within which a vehicle is within interference free data communication distance of a nearby communication station via said data transmitters and receivers;
means available to each communication station for causing it to transmit an idle indication in each time slot not used in data exchange with a vehicle;
means at each said vehicle for transmitting a vehicle identifier in an idle time slot of a block assigned to a nearby communication station in order to seek assignment of said idle time slot;
means available to each said communication station for causing it to respond to a vehicle's transmitted identifier in an idle indicated time slot to assign that time slot for data communication with that vehicle and to retransmit in that time slot an acknowledgement of assignment of that time slot to that vehicle so identified, each acknowledgement being unique to the vehicle acknowledged;
a reference frequency source at each said vehicle having a frequency substantially equal to the common frequency of said beacons;
means at each said vehicle for receiving said radio beacons and for detecting the difference in phase between said reference frequency and received beacon signals;
means at each said vehicle for detecting acknowledgement of time slot assignment and for transmitting in its assigned time slot phase data representing phase differences detected at said vessel;
means available to each said communication station for calculating vehicle position in response to phase data transmitted by each said vehicle and received by said communication station; and
means for transmitting via a communication station position data representing the calculated position of each said vehicle in the corresponding time slot assigned to each said vehicle.

28. The time shared system for locating the position of a plurality of vehicles according to claim 27 wherein:

each of said vehicle receiving means are adapted to respond only to the strongest received block in said transmission time plan for seeking time slot assignment;

each of said communication stations is adapted to transmit a synchronizing signal at the start of its assigned time block;

means are provided at each of said vehicles responsive to said synchronizing signal in the most strongly received time block for identifying the beginning of that time block assigned to the station with which it is to communicate; and said means for transmitting in the assigned time slot of each of said vehicles is further characterized by having:

means for registering the number of time slots between said synchronizing signal and its assigned time slot;

means for counting the number of time slots after each synchronizing signal until the count corresponds to the registered number; and means for transmitting and receiving data only during that time slot occuring when the count corresponds to the registered number.

29. The time shared system for locating the position of a plurality of vehicles according to claim 28 wherein:

said counting means is adapted to count in a predetermined phase synchronization with the data received by said receiving means at each said vehicle;

said communication stations have means for detecting the time of reception of data in each time slot relative to the time for transmission in each time slot at each said station, said time of reception representing range between said station and the corresponding vehicle; and said calculating means is adapted to calculate position consistent with the range of each vehicle from the communication station selected for data communication in response to said time of reception of data at said communication station.

30. The time shared system for locating the position of a plurality of vehicles of claim 27 further comprising means for evicting a vehicle from an assigned time slot when proper data exchange with the vehicle in that time slot is impeded.

31. The time shared system for locating a plurality of vehicles of claim 27 wherein:

said data transmitters and receivers of said vehicles and stations operate on FM modulation and hard-limiting FM reception respectively;

said communication stations are so placed that signals transmitted from a vehicle can be received at more than one communication station due to traffic demands requiring close geographic placement of each station in the same group; and each said communication station has means available to it to assign a time slot to a vehicle received by more than one communication station at only one station which is the nearest one to that vehicle;

the FM, hard-limiting characteristics of said data transmitters and receivers eliminating interference at or from other stations in the same group.

32. A time shared system for locating the position of a plurality of vehicles by comparing signals received at each vehicle from a plurality of radio beacons on a common frequency and for communicating the position of the vehicles to a vehicle dispatcher comprising:

a plurality of communication stations at known geographical positions, said communication stations having data transmitters and receivers on at least one assigned frequency;

means at each said vehicle for data receiving and transmitting on said at least one frequency assigned to said communication stations;

said plurality of communication stations being subdivided into groups of at least one station each with each said group having assigned to it a unique block of time in a periodic transmission time plan which block differs from the block of time assigned to all stations in other groups;

each time block being subdivided into sequential time slots with each slot adapted for time shared data communications between a single communication station and a single vehicle;

each station of a given group being geographically positioned to provide an area of communication coverage at any point within which a vehicle is within interference free data communication distance of a nearby communication station via said data transmitters and receivers;

means available to each communication station for causing it to transmit an idle indication in each time slot not used in data exchange with a vehicle;

means at each said vehicle for counting a preselected number of said idle indications in the time block of a nearby communication station;

means at each said vehicle for transmitting a vehicle identifier in the first idle time slot of the time block of said nearby communication station after said preselected number of said idle indications have been counted;

means available to each said communication station for causing it to respond to a vehicle's transmitted identifier in an idle indicated time slot to assign that time slot for data communication with that vehicle and to retransmit in that time slot an acknowledgement of assignment of that time slot to that vehicle so identified, each acknowledgement being unique to the vehicle acknowledged;

a reference frequency source at each said vehicle having a frequency substantially equal to the common frequency of said beacons;

means at each said vehicle for receiving said radio beacons and for detecting the difference in phase between said reference frequency and said received beacon signals;

means at each said vehicle for detecting acknowledgement of time slot assignment and for transmitting in its assigned time slot phase data representing detected phase differences at said vehicle;

means at each said vehicle for recommencing the counting of said preselected number of said idle indications and for terminating data transmission after a preselected number of time slots in which data is transmitted;

means available to each said communication station for calculating vehicle position in response to phase data transmitted by each said vehicle and received by said communication station;

means for storing each said calculated position and for providing indexing for said stored position data to identify the vehicle to which the position data applies;

means for receiving requests for specific vehicle position from a dispatcher; and means for communicating to said dispatcher the stored position of the vehicle whose position said dispatcher requested.

33. The time shared system for locating the position of a plurality of vehicles of claim 32 wherein:

said means for receiving requests is adapted to receive messages from a dispatcher, each said message having at least one vehicle as addressee, and to cause transmission of said messages in the time slots assigned the said at least one vehicle addressed from the appropriate communication station;

each said vehicle has means for transmitting vehicle status messages in its assigned time slot and for detecting and displaying message data received in its assigned time block;

said means for receiving requests is further adapted to receive said vehicle status messages; and said means for communicating is adapted to communicate to said dispatcher said vehicle status messages of each vehicle along with the stored position of that vehicle.

34. The position locating system of claim 1 further including:

means associated with said communication station for transmitting a message for one of said vehicles; and means associated with said vehicles for receiving said transmitted message.

35. The position locating system of claim 34 wherein said message transmitting means includes:

means for transmitting an alarm message; and said vehicle receiving means includes means for providing an indication of a received alarm message.

* * * * *